United States Patent [19]

Richardson

[11] 4,370,688
[45] Jan. 25, 1983

[54] FLOPPY PACK WITH ENHANCED ORIFICE MEANS

[75] Inventor: Harvey J. Richardson, Sepulveda, Calif.

[73] Assignee: Burroughs Corporation, Detroit, Mich.

[21] Appl. No.: 156,199

[22] Filed: Jun. 3, 1980

[51] Int. Cl.³ .................. G11B 23/02; G11B 25/04
[52] U.S. Cl. ................................ 360/99; 360/133
[58] Field of Search ........................... 360/97–99, 360/133

[56] References Cited

U.S. PATENT DOCUMENTS

| 3,794,017 | 11/1976 | Barkhuff et al. | 360/98 |
| 4,086,640 | 4/1978 | Ragle et al. | 360/99 |
| 4,167,029 | 9/1979 | Ragle et al. | 360/133 X |

Primary Examiner—John H. Wolff
Attorney, Agent, or Firm—John J. McCormack; Nathan Cass; Kevin R. Peterson

[57] ABSTRACT

Improved flexible disk pack magnetic storage systems and associated elements are illustrated as adapted for end-wise pneumatic partitioning and indicate, among other features, the use of "rim type structure" in the gap between adjacent flexible disks and surrounding holes therein, to better isolate the axial pressurized air streams through such holes from "non-selected" gaps and also to provide a reference surface for registration of the disks in the course of compressing the stack together; this "rim means" including "annulets" surrounding the holes not communicating pneumatically with a given gap and "semi-annulets" partly surrounding other holes which are in pneumatic communication with the gap—and wherein such holes are circular except for the "in-communication" holes or orifices which are preferably enlarged by a "crescentic cut-out" opposite the respective "semi-annulet".

15 Claims, 19 Drawing Figures

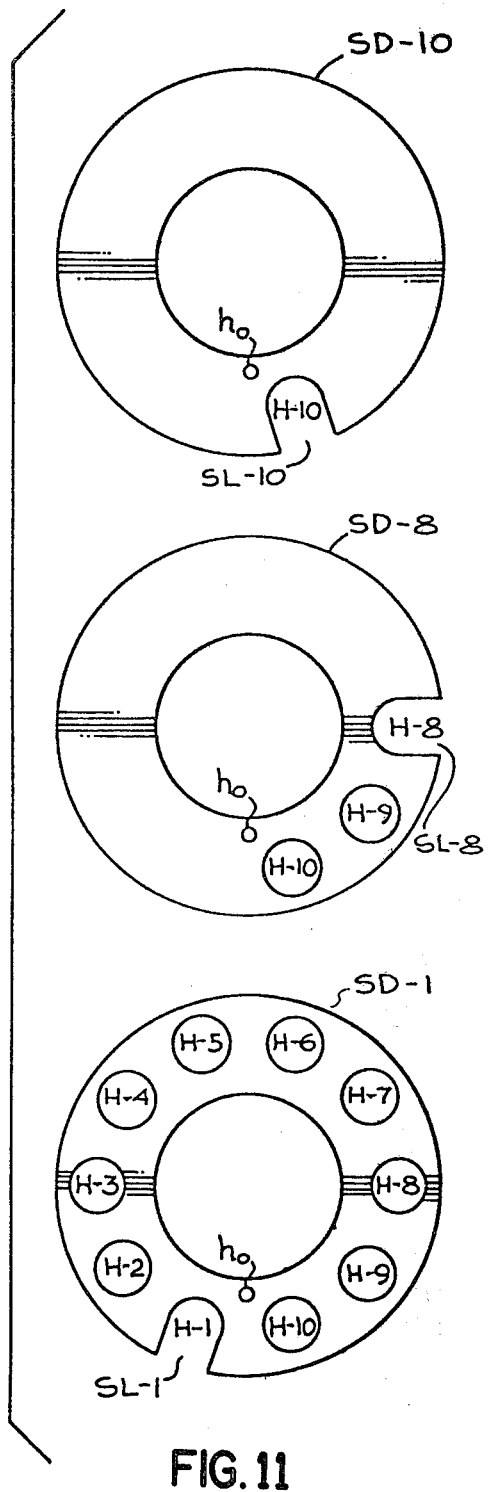
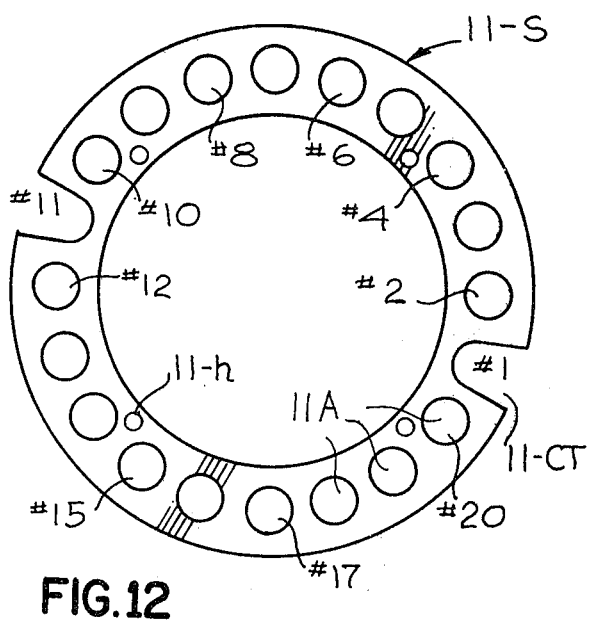
FIG.11
FIG.12

FLOPPY PACK WITH ENHANCED ORIFICE MEANS

INTRODUCTION, BACKGROUND

This invention relates to flexible recording disk packs and particularly to improved techniques for providing them as better adapted for axial pneumatic partitioning.

Workers in the subject art have constructed record storage apparatus using coaxial stacks of flexible record disks, as indicated, for instance in U.S. Pat. Nos. 3,838,462; 3,838,461; 3,969,767 and 4,167,029.

Workers are aware that the use of floppy disk packs dictate minimal cost for pack elements and associated equipment, such as partitioning means. The invention is directed toward this end, and toward accommodating a simple, non-mechanical, pneumatic end-wise partitioning of floppy disk packs, as well as toward providing improved disk packs which are better adapted to meet the foregoing problems and objectives. Such disk packs and associated end-wise partitioning means may be gleaned from the cited U.S. Pat. No. 4,167,029 for "Jet Distributor for End-Wise Pneumatic Partitioning of Disk Pack" filed by H. Ragle et al. and commonly assigned herewith, this being incorporated herein by reference.

For instance, in some prior versions of such pneumatically partitioned floppy packs, an axially movable piston is disclosed as positioned within the tubular spindle-hole and adapted to control an input air flow for generating the access opening in a selected gap (i.e., for "hub-originated air partitioning"). A jet of air received by the piston can be redirected to supply a circumferentially aligned, radially-directed air jet for initiating the partition opening. In many instances, it is preferred that the disk being transduced be backed by fully spaced, stable disks. To this end, separation air may be supplied to floppy disks adjacent to the selected disk. Unlike such "hub-originated" air-partitioning, this teaching directs partitioning air streams axially of the pack and guides them across inter-disk gaps using "rim means" with enlarged orifice means according to this invention.

Thus, in one preferred showing, the invention will be seen embodied in an axially-partitioned pack of recording disks flanked by upper and lower "dummy" packs, these in turn flanked by respective (upper, lower) end-plates. Partition holes are provided through the disks, with annular rim means provided to surround these holes and afford better pneumatic isolation as well as providing a surface for disk support. According to a preferred feature, each "recording gap" (space between recording disks) has at least one of these rim means broken-away (at least partly, and preferably so as to divert air radially inward) so that the associated partition air jet will be circulated more widely as the pack rotates. In a further optional feature, such rim means are combined with an inner "hub-rim" to isolate the hub (spindle) area, to deflect and distribute gap air and to cooperate with the rim means in creating a solid support surface for adjacent disks. Such rim means will be seen to direct and divert partitioning-air along the plane of the disks for more effective pneumatic partitioning.

Prior Art

Workers in the art have, of course, considered various techniques for providing flexible disk packs. For instance, in cited U.S. Pat. No. 3,969,767 to Griffiths et al. (and in references noted therein) attention is directed to semi-rigid washers, coaxially disposed to form an air-permeable spindle for coaxially supporting flexible record disks. Such washers have radially extending passageways and teach a rotating tubular spindle where means for supplying gas thereto to be distributed radially outward from the hub of such a pack through such air permeable washers. A rigid stabilizing plate at each axial end completes this assembly. The following IBM technical disclosure bulletins also show stacks of flexible disks with various means of partitioning suggested: IBM-TDB August '77, page 914; IBM-TDB of April 1977, page 4229 (showing "vent holes" for self-ventilation of the pack, except for provision of a relatively non-apertured central disk) and IBM-TDB of November 1974, pages 1710, 1711 (where a record disk pack is flanked by upper and lower dummy packs including disks separated by spacers and wherein the disks include a ring of ventilation holes to be placed in registry along the stack). Neither this, nor any other, known prior art has any suggestion of the aforementioned "rimming" of partition holes in the gaps between disks or of any associated orifice re-configuring.

The present invention is directed toward providing improved flexible disk packs—these being better adapted to meet the foregoing problems and objectives. The foregoing and other features, objects and advantages according to this invention will be more fully appreciated and will become more apparent upon consideration of the following description of the preferred embodiments taken in conjunction with the attached drawings, wherein like reference indicia denote like elements.

BRIEF DESCRIPTION OF THE DRAWINGS

FIGS. 3 and 4 show respective forms of a disk from such a pack, as modified with a "rimmed" spacer apt for use with the invention—one that is formed of two half-spacers pressed "back-to-back"; while

FIG. 11 is a plan view of a set of "non-rimmed" spacers unlike those above mentioned, while FIG. 12 similarly shows another kind of "non-rimmed" spacer;

FIG. 13 shows in partial plan view a flexible disk surface including an alternative sort of "rim means"; while

DETAILS OF THE PREFERRED EMBODIMENT

An improved spacer embodiment is taught, one intended to afford better partitioning with such floppy disk packs according to the invention. Such will now be described in terms of the preferred embodiment shown in FIGS. 1–5.

Embodiment of FIGS. 1–5

Figure 1:
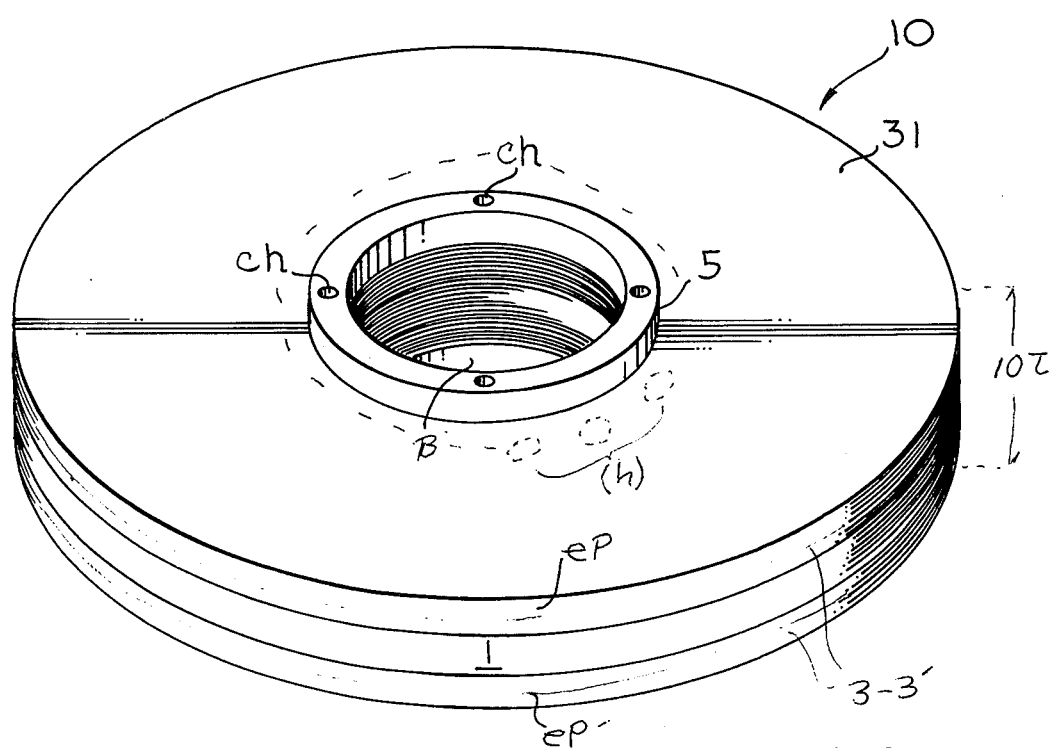
FIG. 1 is an upper perspective rather schematic showing of a flexible disk pack adapted for using the subject invention; with FIG. 5 showing this pack in partial schematic side section.
Figure 5:
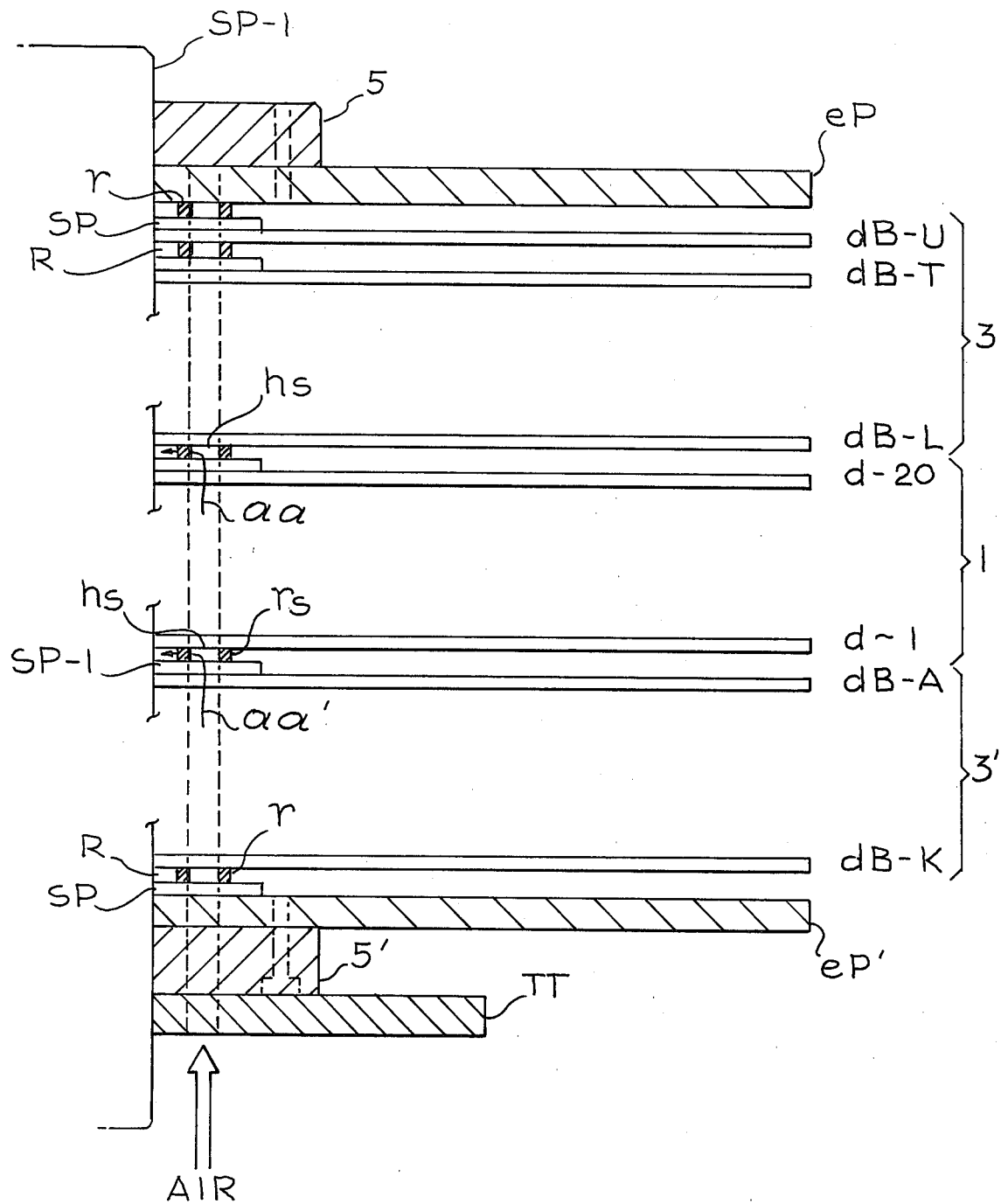

A composite flexible magnetic recording disk unit 10 is shown in FIGS. 1 and 5 and will be understood as adapted to impart improved axial partitioning characteristics. Unit 10 will be understood as comprised of three multi-floppy disk packs, with spacers between all floppy disks: i.e., a recording pack 1, flanked by a pair of upper/lower "dummy" packs 3, 3', plus associated outer end-plates eP, eP' or stiffeners. Unit 10 is adapted to be conventionally engaged by a known rotation assembly for prescribed high speed rotation (like those used with other high performance floppy pack arrangements and involving disk rotation on the order of several thousand rpm or more). Disk rotation, transducer operation and associated control means will be understood as provided by conventional means (not shown here).

That is, recording pack 1 comprises a stack of like flexible recording disks (e.g., d-1, etc., preferably of a conventional 1.5 mil polyethylene terephthalate) stacked in registry for high speed rotation, being separated uniformly by cylindrical washers, or "spacers". Here, "separation air" and "partition-air" is to be drawn axially, via partition holes h, $h_s$ through the disks and the spacers as more completely detailed in U.S. Ser. No. 960,267, filed Nov. 6, 1978 for "Partitionable Record Pack", now abandoned in favor of Ser. No. 155,366, filed June 2, 1980 for "End-Wise Partitionable Disk Pack by Dean DeMoss and Herbert U. Ragle (hereby incorporated herein by this reference). In this embodiment, the spacers' partition holes $h_s$ are "crescentically—enlarged" to enhance thru-put (see below).

Each "dummy" pack 3, 3' may be understood as comprising an outer stiffener (cf. end-plates eP, eP' mentioned below) and an array of adjacent spaced supporting flexible disks, or ("dummy" disks dB-A, etc.), these being separated by spacers (sufficient to accommodate a prescribed maximum deflection of record disks d). This will also accommodate a prescribed maximum deflection upon head entry—without detracting from the normal flexible disk/head engagement familiar to those in the art of floppy disk recording with stacks of floppy disks. The planar end-plates (or stabilizer plates) may be conventional rigid stack, but preferably comprise a stack (e.g., 30) of contiguous un-spaced floppy disks like the disks in packs 1, 3, 3'—each endplate to be centrifugally spun-flat once the array 10 reaches nominal rpm (as detailed in U.S. Ser. No. 155,366 cited elsewhere). The end-plates are apertured with partition holes and fastener-holes adapted to register with those through the disks and spacers (congruent patterns) as indicated functionally in FIG. 5.

Dummy packs 3 and 3' are provided to offer a smooth transition between the adjacent rotationally-stiffened end-plates and the deflecting motions of the recording disks in pack 1, during partition deflection. Thus, each dummy stack serves to separate the closest recording disk d from an (otherwise-adjacent) end-plate by a prescribed distance which allows maximum partition-deflection thereof, while still isolating it somewhat from "high pneumatic impedance" zones adjacent that end-plate.

The record and flanking "dummy" packs are all held together in one integral disk unit, (module 10) by rigid relatively conventional retaining plates, such as collars 5, 5' illustrated and their associated fasteners (e.g., connecting rods, not shown). Such fasteners (rods) may be threaded through the collars (see four coupling-holes ch) and intermediate disks, spacers and end-plates—these all being apertured to receive them (e.g., via coupling holes ch). Such collars also serve to close (upper collar) the upper end of the partition bores since they are wide enough and properly located to span these. Retaining plates (collars) will not be necessary where the multi-floppy stabilizer plates eP, eP' are replaced by conventional rigid end-plates (and the upper rigid plate will not be perforated with partition holes). The central hub-bore defined by the stacked disks will be understood as conventional (e.g., 1.0″ dia. here) for accommodating drive-spindle means. The entire module 10 is adapted for engagement with an accommodating turntable, as known in the art.

Ordinarily, the indicated clamping—i.e., pressing the collars against the flexible disk material and intervening spacers—will be adequate to hold the relative position of disks and spacers. The central bore B (see $H_c$ in FIG. 3), or hub channel, may be any convenient size to accommodate rotation coupling means. Unlike conventional hub-holes, however, it will not be required to admit "partition air" or "separation air" (to be passed through the spacers radially into the gaps between floppy disks). This is because such air can, instead, be introduced via partition holes as noted below (see holes h, $h_s$).

Record Pack 1

In its preferred form, the record pack 1 will be understood as preferably comprising a stack of like flexible recording disks stacked in registry and uniformly separated by like spacers, with the supporting "dummy-disks" being provided to accommodate the expected partition deflections and resilient engagement of such recording disks with an associated transducer. (A typical known rigid "floppy disk transducer" such as transducer TR, FIG. 2, being preferred, as known in the art). Pack 1 is here preferably comprised of about 20 floppy disks (1.5 mil each), stacked to each be uniformly separated by a rigid spacer/washer (e.g., made of metal, plastic or the like—disks and spacers being perforated with the mentioned holes h, $h_s$ and ch).

Figure 2:
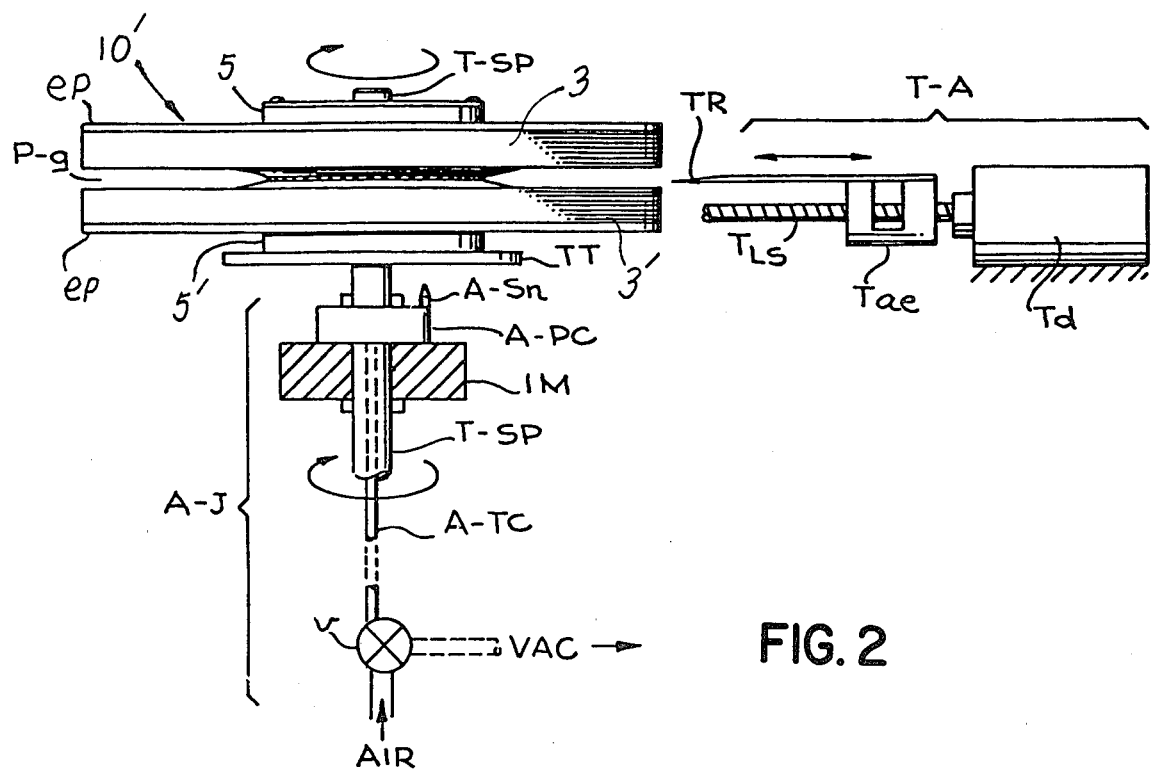
FIG. 2 is a rather schematic elevation showing a simplified exemplary arrangement for end-wise pneumatic partitioning of such a disk pack, along with means for rotating the pack and means for selectively injecting a transducer assembly into the pack.

Pneumatic, axial partitioning; FIG. 2

FIG. 2 schematically suggests how a floppy pack embodiment like that of FIGS. 1 and 3–5 may be partitioned axially, or "end-wise", and pneumatically (for more details please refer to U.S. Ser. No. 155,366 cited above).

Thus, FIG. 2 is a schematic, rather generalized functional showing of a flexible disk unit 10' mounted on a conventional spindle T-SP and turntable TT (for relatively high speed rotation; unit 10 being understood as generally the same as unit 10 described above, being retained between a pair of collars 5, 5'). A pneumatic partition assembly AJ will be understood as adapted to pneumatically partition the record pack 1 (between dummy packs 3, 3' as in FIG. 1) for access entry of a conventional transducer array TR, adapted for high speed transduction as generally understood in the art. Here, and elsewhere, the materials, mechanisms and systems alluded-to should be understood as conventionally constructed and operated as presently known in the art, except where otherwise mentioned.

For illustration purposes, a conventional transducer array TA is very functionally indicated and understood as adapted for selective translation (as indicated by arrow) into, and out of, partition gap g between recording disks in pack 1 so as to present the transducer array TR in transducing relation with a prescribed disk surface. The partitioning air supplied by partition jet assembly AJ is adapted to present a high speed jet of partitioning air end-wise of unit 10', to be entrained up a prescribed one of the bores generated by the array of registered partitioning-apertures h in the spacers and disks. This selection may be controlled according to the rotational position, or indexing, of a delivery jet nozzle A-SN relative to unit 10'.

Figure 3:
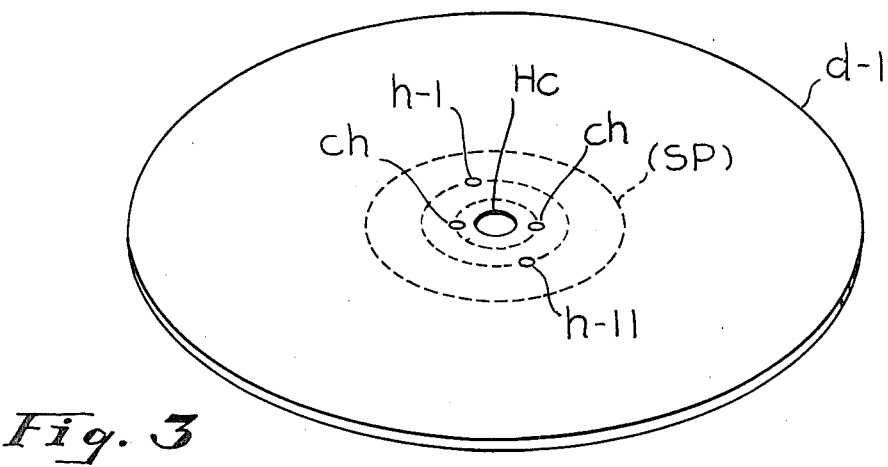
Figure 4:
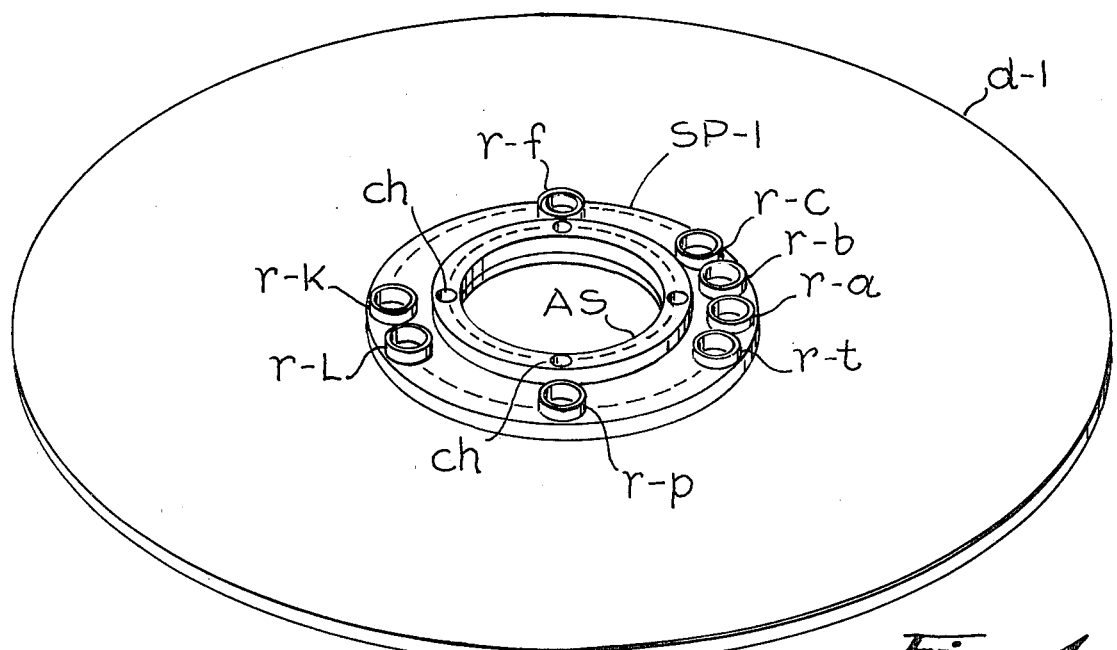

"Rimmed" partition-holes, FIGS. 3, 4 and 5

FIGS. 3-5 indicate how the circumferential array of partition holes are disposed in registry through the disks and intermediate spacers (so stacked) to form an array of "partition bores" extending axially of unit 10. More particularly, they indicate how, according to a feature of interest, air conduit means, or "rims", may also be used to afford more effective jet conduction along such bores between disks, and also to, collectively, provide an annular "support-plane" (made up of a circumferential array of rims, e.g., the top surfaces of rings r-a through r-t in FIG. 4).

Figure 15:
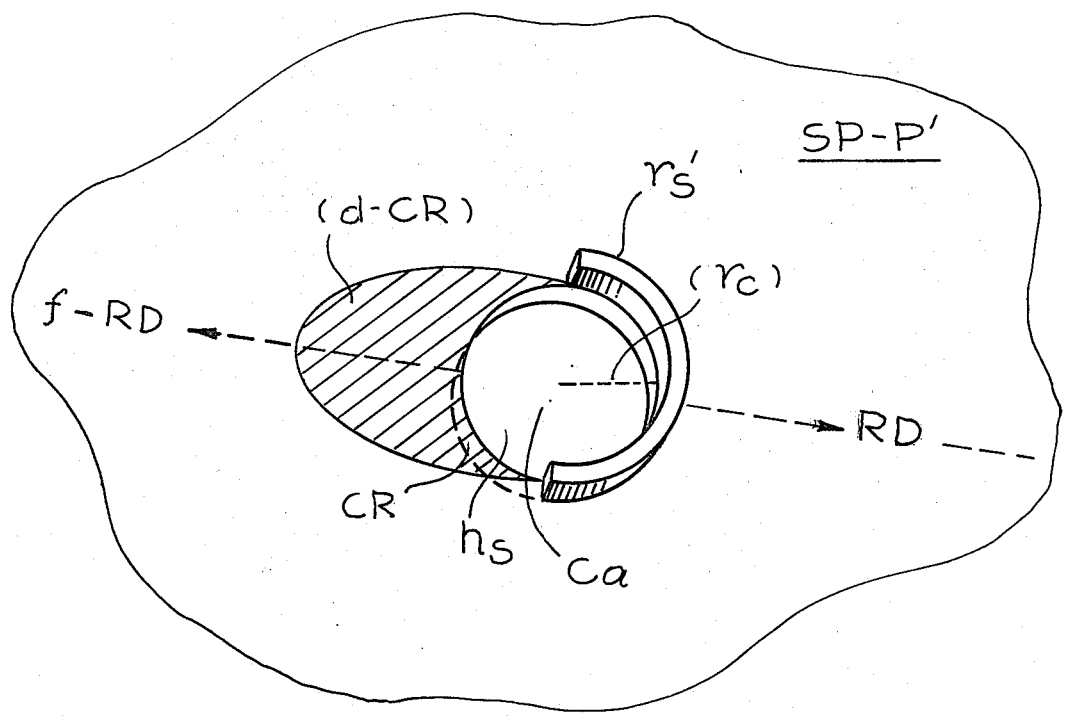
FIG. 15 is a very fragmentary, enlarged top view of the section of a "rimmed" disk spacer like that in FIGS. 3 and 4 with enlarged "crescentic" orifice means according to this invention, and a variation thereof in FIG. 16.

In a related feature, one can see that certain spacer "rims" are "partial", i.e., broken-away so as to extend less than 360° about their hole $h_s$ and so as to divert their jet stream into the inter-disk gap they bridge. (AS discussed below, for instance, in FIG. 5 note arrows aa and aa' wherein the jet stream is functionally indicated as proceeding from its entry point, at "AIR-IN", to emerge and be directed radially inward along two inter-disk gaps, namely that between disks d-1 and dB-A and that between disk dB-u and upper end-plate eP. It will be understood that the partition air column along any partition bore, may, for instance, be directed to traverse the full bore-height, between bottom end-plate eP' and upper collar 5 (closing all holes h). Thus, the jet column may, in effect, rebound off the upper metal collar 5 and return to exit at the "selected" gap, or gaps, having an associated "semi-rim" opening as "exit-orifice". As shown in FIG. 15 (discussed below) this orifice is enlarged for better thru-put according to this invention.

As detailed below, this may be effected by using spacer means as constructed from "half-spacers" (see sp-a, sp-b in FIGS. 8 and 9) bonded together, "back-to-back". Such spacers include an identical circumferential array of partition holes $h_s$, all provided with full cylindrical rims (rings r), except in the case of "select holes" $h_s$ where only a "semi-rim" (or half-ring) $r_s$ is provided. Semi-rims $r_s$ are adapted to divert and redirect their jet stream inwardly for better pneumatic partitioning of their associated gap (as described below). Similarly in FIG. 5 the "select hole" $h_s$ in spacer SP-1, between disks d-1 and dB-A will be understood as surrounded by a "half-rim" $r_s$ to divert air in the manner indicated by arrow aa'.

The floppy disks in stacks 1, 3 and 3' (FIGS. 1 and 5) will thus be understood as generally including a conventional center hold $H_c$ as indicated in FIG. 3 surrounded by a conventional array of coupling holes ch adapted to receive the coupling bolts retaining the packs together (e.g., between upper and lower collars 5, 5', as in FIGS. 1 and 5). The circumferential array of holes ch is, in turn, surrounded by a circumferential array of partition holes h (20 holes, h-1 through h-20 are illustrated on record disk d-1 in FIG. 3).

Thus all spacers and all disks will have 20 partition holes and be stacked so these holes (and the coupling holes) register in a particular pattern. Those holes will be rimmed, or semi-rimmed, on at least one side of each spacer (preferably on both sides). The semi-rim may encompass roughly 180° on the radially-outer sider of a spacer's partition hole, or encompass more or less degrees depending upon the desired jet deflection and diversion. In some instances (e.g., see FIGS. 13 and 14) the spacers may be eliminated, with the floppy disks themselves being "rimmed".

Hub-rim AS provides a registration surface against which the adjacent floppy disk surface may be pressed and positioned—as well as preventing the exit or entry of air from the hub region and deflecting and diffusing an incident jet stream. Rim AS also keeps the disks relatively flat, especially as used in conjunction with the "co-planar surface" formed by the circumferential array of partition-rims r—all these being of the same height.

Figure 4A:
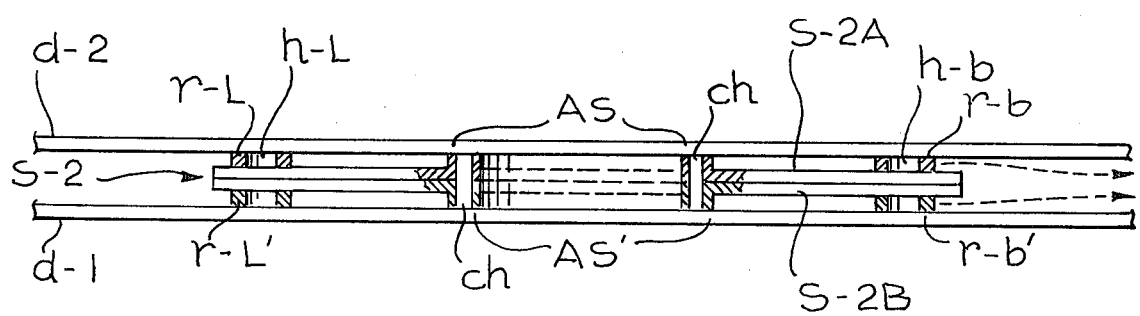
FIG. 4A shows a schematic sectional view of such a spacer in place between floppy disks.
Figure 4B:
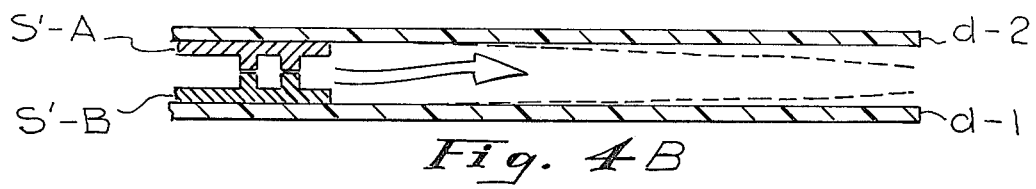
FIG. 4B is a like view of two such half-spacers pressed face-to-face and FIG. 4C is a like view of an array of like "rimmed" spacers, each formed from one integral piece.
Figure 4C:
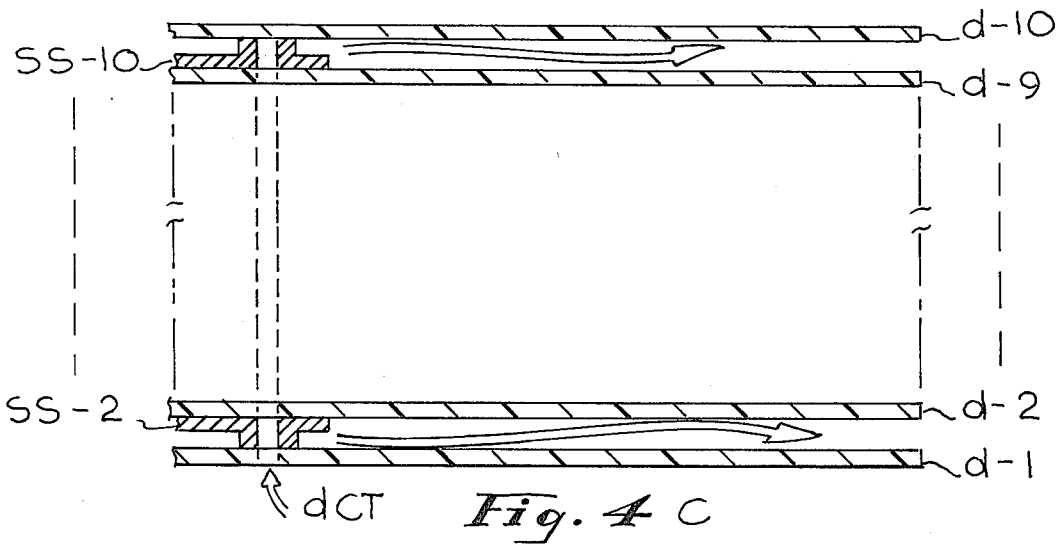

Spacer construction; FIGS. 4A, 4B, 4C

Figure 8:
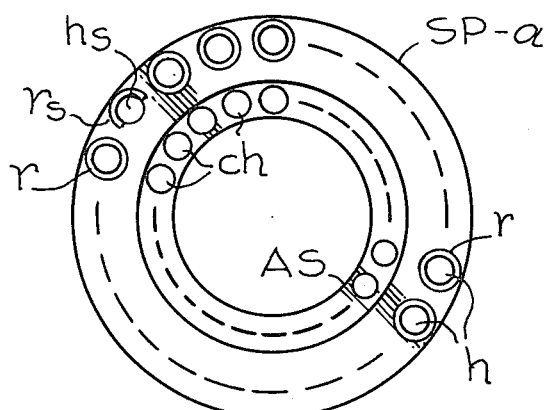
Figure 9:
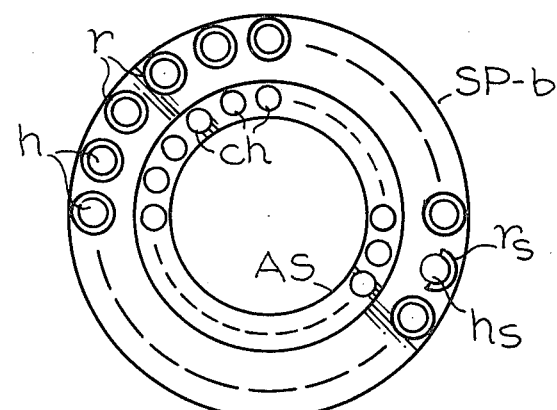

One may form the spacer disks of metal, as with half-spacers sp-a, sp-b in FIGS. 8 and 9. This may be any convenient etchable metal (or other rigid material such as plastic) the rimming may readily be etched-away on one surface of such metal half-spacers, to thereby present rim means on one side thereof. This technique is well known and readily available.

Such half-spacers may be pressed "back-to-back" (with non-rimmed faces flush) into a bi-part spacer held together by the collars 5, 5' and connecting rods. When the two semi-rims pass air they will, in effect, form two upper/lower orifices and project two mini-jets of separation air; these following the two opposed respective disk surfaces, as indicated in FIG. 4A (see arrows). Alternatively, such half-spacers S-2A, S-2B may be pressed "face-to-face" to form one larger, mergent, central air stream as indicated in FIG. 4B (see arrow)—but unfortunately such a stream tends to introduce a partial vacuum and suck the disk edges together (as indicated in phantom in FIG. 4B), thus closing-down the inter-disk gap undesirably.

In some cases it will be preferable to fashion the rigid spacer from a single integral plate as indicated in FIG. 4C at SS-2 and SS-10; especially, since this will effectively replace the two mini-jets of the FIG. 4A embodiment (half-spacer/back-to-back) with a single larger more effective jet stream.

For instance, half-spacers S-2A, S-2B of FIG. 4A may comprise 10 mil aluminum stock etched-back by about one-half (leaving 5 mils as base with 5 mil rims thereon)—this presenting a pair of upper/lower, high impedance 5 mil jet orifices in each 20 mil gap (e.g., as between d-1, d-2 in FIG. 4A), with some possible dead-space (non-laminar flow) adjacent the opposing disk surfaces. By contrast, the single spacer embodiment of FIG. 4C may comprise 20 mil stock, similarly etched-away by half, leaving 10 mil rims (on 10 mil base) and a single jet orifice 10 mils high.

It was observed that spacers like those of FIG. 4A induced an undesirable "clumping" of disks—whereby some disks appeared to merge toward one another, and so attenuate their respective gap-heights (or disk-separation, at least adjacent their outer periphery), while others would diverge and so open-up their separation distances, and still others would not appear to be affected, maintaining the prescribed separation. Surprisingly, this phenomenon was also repeatable—not random—i.e., every gap would react the same way for a given set-up no matter how many times the pack rotation was interrupted. Also, this clumping should be distinguished from a "wobble" or "flutter" of a disks periphery—such is not involved here.

Surprisingly, when the bi-part spacer configuration (of FIG. 4A, etc., which projects two tiny jet streams out each gap) was replaced by a single-sided version as with (either) SS-2 or SS-10 in FIG. 4C, the problem essentially disappeared—with the disks flying much more evenly and with almost perfectly constant separation and no "clumping" (at least to the naked eye). This was so even when these "single-sided" spacers were not arranged in "stacked (up/down) opposition" (as in FIG. 4C, i.e., even where all spacers had their "rimmed" side facing up, or all down).

Figure 13:
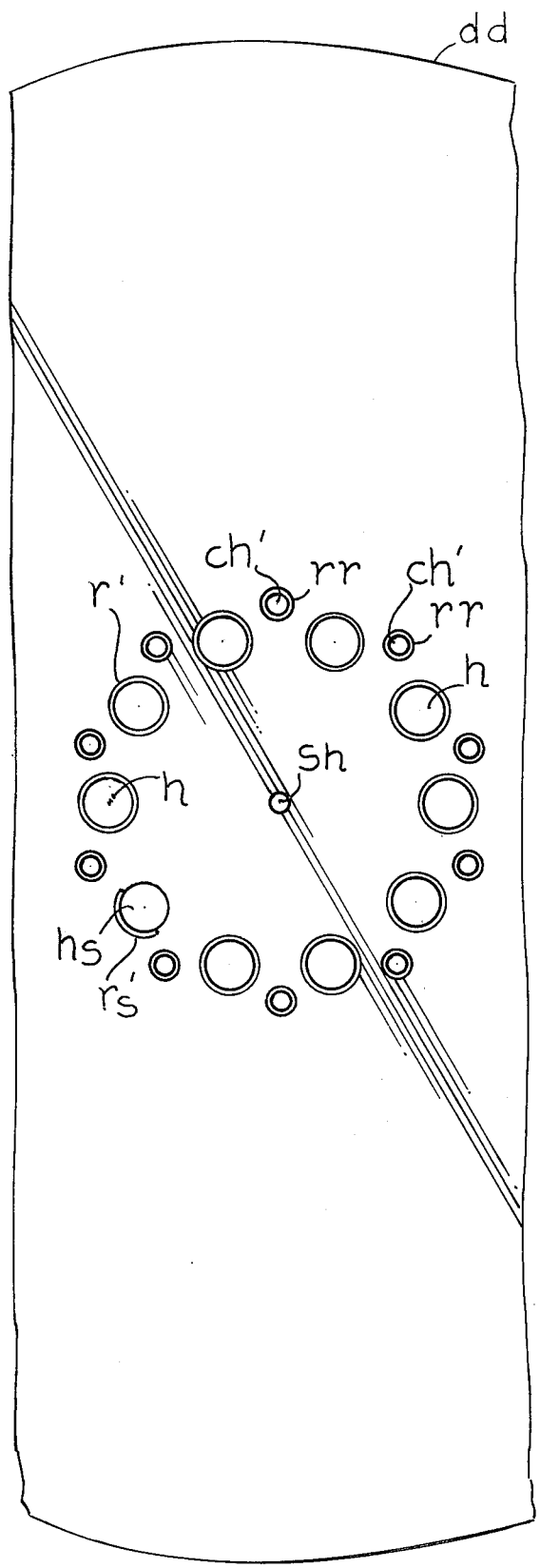
Figure 14:
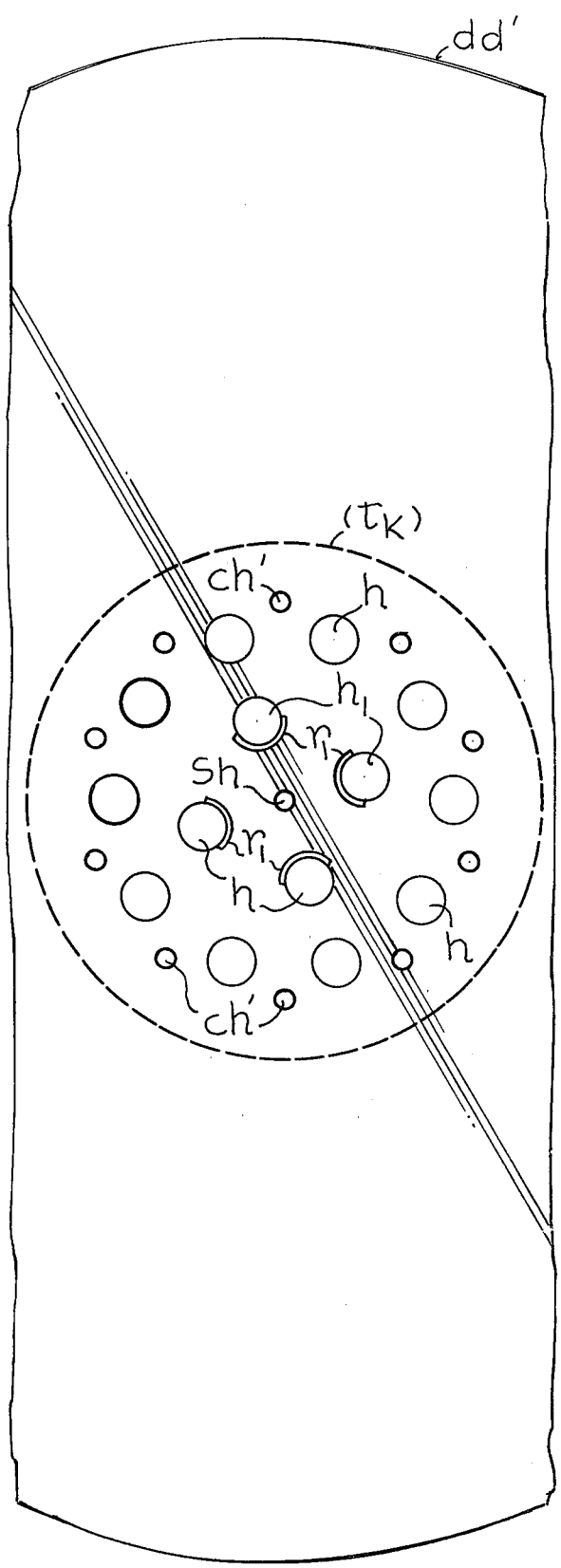
FIG. 14 is a like view of a modification thereof.

Alternatively, one may form such rings out of plastic with rim-bosses bonded thereon as known in the art, or one may silk screen or paint the rim material onto the plastic disk itself as indicated for those in FIGS. 13 and 14.

"Hub-rim"; FIG. 4:

FIG. 4 is similar, showing record disk d-1 with spacer SP-1 superposed thereon, the spacer being penetrated by a circumferential array of coupling holes ch—these to be stacked in registry with an identical array of like holes ch on disk d-1 and all the other disks and spacers. Also, a circumferential array of aperture holes h is provided in SP-1, these presumed as stacked in registry with hole array h-1 through h-20 in all disks and spacers (e.g., see FIG. 3). According to the aforementioned "rim" feature, each of these partition holes h is surrounded by a rim means r, there being 19 full identical cylindrical rims r-a and r-c through r-t, with one "partial rim" r-b (or semi-rim) at hole $h_s$. "Semi-rim" r-b is adapted to admit the jet stream for partitioning at its gap, directing it radially inward for centrifugal distribution (orifice $h_s$ enlarged as above).

Spacer SP-1 will further be seen as including a "hub-rim" or annulus AS of a width sufficient to span the diameter of coupling holes ch, of the same height as rims r (which are all the same height) and completely circling the hub edge (or radially-innermost portion) of the spacer. Thus, when all the disks and intermediate spacers of unit 10 are compressed between collars 5, 5', the upper surfaces of rim AS and rim array r-a through r-t will be co-planar and form a reference surface and support platform for the floppy disk dB-A pressed thereon.

Thus, according to this embodiment, when a partitioning jet stream is selectively directed up the "h-b" partition bore through unit 10, it passes spacer SP-1 between disks d-1 and dB-A and will emerge into the gap therebetween, being deflected and diverted by semi-rim r-b—proceeding radially inward and, striking hub-rim AS, to be redirected over a wide sectorial angle. Centrifugal forces experienced by the spinning pack will throw this stream radially out for better, more effective partitioning over a wider sectorial angle (as opposed to using other simpler spacer means, such as slotted spacers SD-1, etc., of FIG. 11, where the mere outward slotting of a partition hole is adapted to throw the jet stream outward in a narrower sectorial angle and thus partition the gap more narrowly).

Of course, workers will understand that such an array of partition holes and associated rim means may be modified so that several partition holes and associated semi-rims, rather than one, may be employed for each partition-gap. (Somewhat analogous to the opposed pair of slotted holes No. 1 and No. 11 in spacer 11S of FIG. 12, although this spacer is not provided with rim means, of course).

According to a further preferred feature of novelty, spacer SP-1 is preferably provided with a second (lower) rimmed face—a face identical to the upper rimmed face shown in FIG. 4, although this bottom face cannot be seen in this view, of course, it is suggested in FIG. 4A). Such an array would, thus provide aperture rims (such as r-a through r-t) plus an associated hub-rim (like AS) on both sides of spacer SP-1 (all the other spacers identical). Such an arrangement is schematically indicated in the fragmentary side-section of FIG. 4A. Here, note that the hub rim AS' on this bottom face is identical to rim AS on the upper face, and that the lower aperture-rims (e.g., r-b', r-1' shown) are, like their counterparts (e.g., r-b, r-1), "semi-rims" for inwardly diverting their air stream—the air streams on each side of SP-1 for the two opposing partition apertures h-b, h-1 being indicated by the arrows.

One way of fabricating such a spacer means, rimmed on both faces according to the invention, is to construct it of two half-spacers pressed "back-to-back" in registry, as, for instance, with identical spacers SP-a, SP-b in FIGS. 8 and 9. These spacers may have their rims etched from annular metal plate means (or otherwide constructed using the same or different material as mentioned below) and placed back-to-back so that the select holes $h_s$, with their semi-rims $r_s$ lie in registry—being held in place by collars 5, 5', etc.

Here and elsewhere, it will be apparent that, although four coupling rods (e.g., bolts or like fasteners) are contemplated in FIG. 1, one may provide redundant coupling holes ch in spacers SP-a, SP-b, etc., as necessary—e.g., one hole ch adjacent each partition hole. This is done simply for manufacturing and assembly convenience allowing any spacer to be rotated by any amount to register its partition holes with those of the rest of the pack—and still always present a coupling hole registered with these of collars 5, 5'. For instance, if, in assembling record pack 1, one wants to use a single common pattern for the record and spacers, he may do this and differentially stack the disks and spacers, rotating them relative to one another (e.g, see U.S. Pat. No. 4,086,641). This redundancy of coupling holes ch with one coupling hole in constant relation to each aperture hole h, thus allows rotation of the spacers relative to one another (in a stack, to change the registration of aperture holes h) will always bring a new coupling hole into registry with those of the pack.

Figure 6:
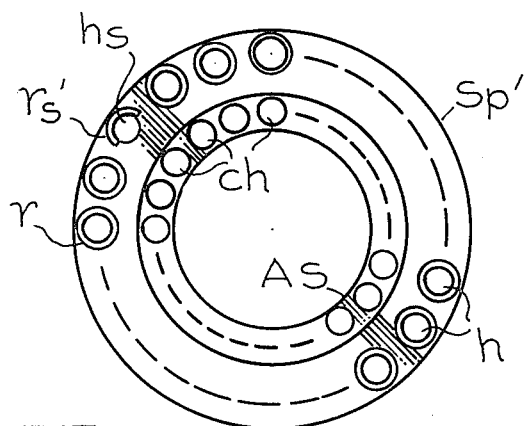
FIGS. 6 through 9 show the same, or similar, type spacers in plan view.
Figure 7:
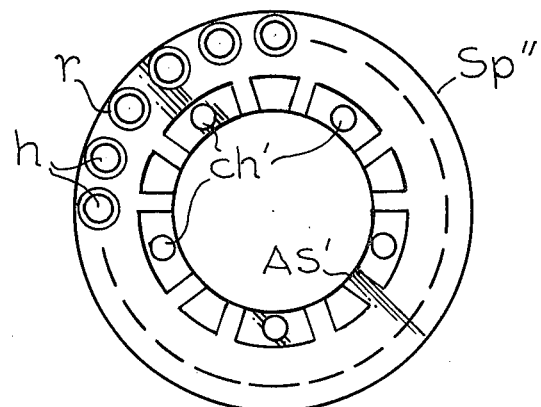

Alternate "spacer-rimming"; FIGS. 6, 7:

"Rimmed" spacer SP' in FIG. 6 will be understood as functionally the same as spacers sp-a, sp-b, except that its "select hole" $h_s$ is not "enlarged". And spacer SP" of FIG. 7 may be taken as representative of a spacer having no "select holes", and thus no "semi-rim" $r_s$—such a spacer may be useful in certain cases (e.g., with a dummy pack), although it is "non-preferred". Spacer SP" also illustrates a modified, "segmented" (or fenestrated) version of a hub-rim—i.e., a rim AS" which is not continuous and integral about the hub, but is breached, or segmented, in a regular symmetric pattern to admit radial passage of "separation air", e.g., air drawn-in to proceed radially-out from the hub region and expand the inter-disk gap.

Now, at first, it appeared that isolation or separation air could be introduced through the spindle hole and, passing through the openings in fenestrated rim AS' could adequately partition its respective gap. However, it was later observed that this mode tends to introduce insufficient air, "starving" the gap (e.g., between dummy disks) and inducing the flanking disks to collapse upon one another.

Accordingly, it is preferable to introduce separation air (e.g., even for the dummy-gaps) through the partition holes h—assuming sufficient holes are available for this. For instance, one or two particular partition holes may be set aside for use in common by all dummy disks; alternatively, each dummy-gap can be "slaved" to a respective recording gap and so caused to share the air therewith, as detailed elsewhere. Thus, for various reasons this mode of introducing separation air is non-preferred, as opposed to introducing such air through partition holes h as discussed elsewhere.

Enlarged partition orifice (invention); FIG. 15:

In any event, and aside from how one implements the above-discussed spacer-rimming (or any other rimming—e.g., cf. FIGS. 13, 14), it is a feature of this invention to enlarge the partition orifice such as indicated in FIG. 15 (by "crescentic cut-out CR) so as to enhance partition gas thru-put, especially at lower partition-gas pressures.

Thus, in FIG. 15, it will be understood that the spacer means SPP is constructed as before (e.g., as SP-1 in FIG. 5, with half-rim $r'_s$ surrounding partition-hole $h_s$, so as to direct the injected air stream generally radially inward, as suggested by the arrow on disk radial segment RD, except for crescentic enlargement CR. Enlargement, or cutout CR will be understood as enlarging this partition orifice beyond the indicated circular area ca defined by radius $r_c$ (indicated in phantom) on the side opposite deflecting rim $r'_s$. It will be understood that this enlargement is provided to accommodate lower partition pressures (e.g., a few psi for such arrangements)—and that, rather surprisingly, it facilitates effective low-pressure partitioning all by itself—a startling effect for such an apparently minor change. For example, where such arrangements could not be satisfactorily partitioned with air streams below about 10-15 psi when the orifice was generally circular (as at ca), mere enlargement to triple orifice area; using a big crescentic cut-out (as at CR, the area of segment CR being about twice that of circular zone ca) enabled one to operate as low as 7.5 psi!; this indicating a radical increase in flow!

As FIG. 15 suggests, only the spacers (e.g., SP-P) are so "enlarged", preferably leaving the disks with the smaller unenlarged partition holes (as at circular hole ca). This leaves a "crescentic" section of the adjacent disk (e.g., as at d-CR FIG. 15) unsupported by the spacer and possibly apt to be "toggled" into the adjacent gap to interfere with the partition air stream (e.g., especially in cases where a circumferential "wrinkle" appears on that disk near or at section d-CR). This danger will be kept in mind by workers and can operate as a limit on the size of such "enlargements". Such toggling can be eliminated simply by enlarging entry-holes in the disks to match those in such spacers, and rotating each disk, during stack-formation, to present such enlarged disk-holes adjacent the respective spacer orifice.

Figure 16:
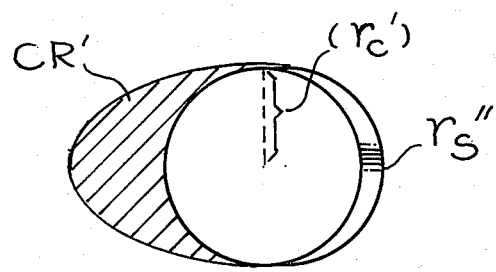

Alternatively in certain cases such a cut-out may intersect more than about half of the normal circular hole; e.g., as in FIG. 16, as opposed to FIG. 15 where CR intersects ca along about 180° of its circumference. [i.e., cut-out CR' in FIG. 16 intersects well over 180° of the circular hole defined by radius $r'_c$]. FIG. 16 also indicates how a semi-rim $r''_s$ may cover well under one-half of such an orifice; and indeed be, itself, cut-into by the cut-out CR'. Also, in certain cases it may be preferable to vary the shape of this cut-out (e.g., triangular rather than "crescentric").

Rimming on disks; FIGS. 13, 14:

Workers in the art will perceive that the aforedescribed feature of "rimmed partition holes" may be otherwise provided. For instance, as suggested for modified floppy disk dd in FIG. 13, the rimming means may be incorporated on the floppy disk itself (and also, if desired, the spacers may be eliminated). One way this may be done is indicated at rims $r'$ and semi-rim $r'_s$ surrounding partition holes h (ten shown, interspersed with coupling holes ch' which are also rimmed with rings rr). In this way a spacer structure may be omitted. Coupling holes ch' are also rimmed, not for air-sealing purposes, but to better maintain the gap spacing and disk planarity. Thus, rims rr, of the same height as rims $r'$, $r'_s$ surround holes ch' (and may surround spindle hole sh for a like reason). Thus, when the disk pack is compressed tightly, the disk faces defining each gap will have several more reference spacer-rims rr against which to be seated. This is more necessary when no rigid spacers are used, since the disks may otherwise be compressed or bend towards one another in the region of the retaining rods (10 rods here, threaded through a collar spanning the ring of holes h and ch, top and bottom). Also, disk dd illustrates the use of "rim means" with a "fixed" pack—as opposed to the "removable" packs illustrated above. Thus, as workers well know, the pack may be attached to the rotation means (e.g., to the turntable via bolts through holes ch' to a single, upper collar—rather than attaching the pack to a pair of opposed collars as in the foregoing embodiments). Center-hole sh is a "sight-hole" used for alignment purposes. Also, with no hub opening no "hub-rim" is appropriate here.

Also, the air jet stream diverted by semi-rim $r'_s$ will be diverted from "select hole" $h_s$ across the center of disk dd to be spun-up by centrifugal forces and directed radially outward through the gaps between the rims around holes h and ch' being suitably diffused by impact with rims $r'$. Here, as with the use of spacers, each "select hole", or partition-orifice, $h_s$ is preferably "enlarged", as indicated, for enhanced low-pressure partitioning. Workers in the art will contemplate other like configurations for "rimming" the holes in a disk like dd and will perceive that such can allow dispensing with spacers.

Workers will generally understand how such a rim arrangement may be implemented. For instance, such rim means are preferably provided on one side of each such floppy disk and comprise thin rings of plastic material bonded to the surface of the plastic disk (e.g., a like plastic which is heat-fused thereto) and so affixed in position about their associated hole.

FIG. 14 may be understood as illustrating another (alternative) "rimmed disk" arrangement, like disk dd in FIG. 13, except as hereafter specified. Here, a like flexible plastic (e.g., polyethylene terephthalate) disk dd' will be understood as also having a central spindle hole sh, plus a ring of coupling holes ch' and an adjacent ring of partition holes h, concentrically surrounding center hole sh. These holes h, ch' will, as in FIG. 13, be provided with respective rims, or semi-rims, as required by the desired jet stream selection for a particular disk face. But disk dd' adds a second concentric ring of air holes $h_1$ (four here, inside the "h-hole ring", these adapted to project dummy-separation air out in four respective quadrants to separate the dummy disks, only). This illustrates that where more air holes are desired, one or more additional rings of holes may be incorporated (as space on the floppy disk allows). Similarly, another supplemental ring of partition holes may be added, outside the "h-hole ring" and along outer track $T_k$, indicated in phantom and schematically. These supplemental partition holes will, of course, have a like pattern of rims and semi-rims as dictated by the desired jet selection for this disk face. And, this may be implemented as indicated for disk dd in FIG. 13.

Figure 10:
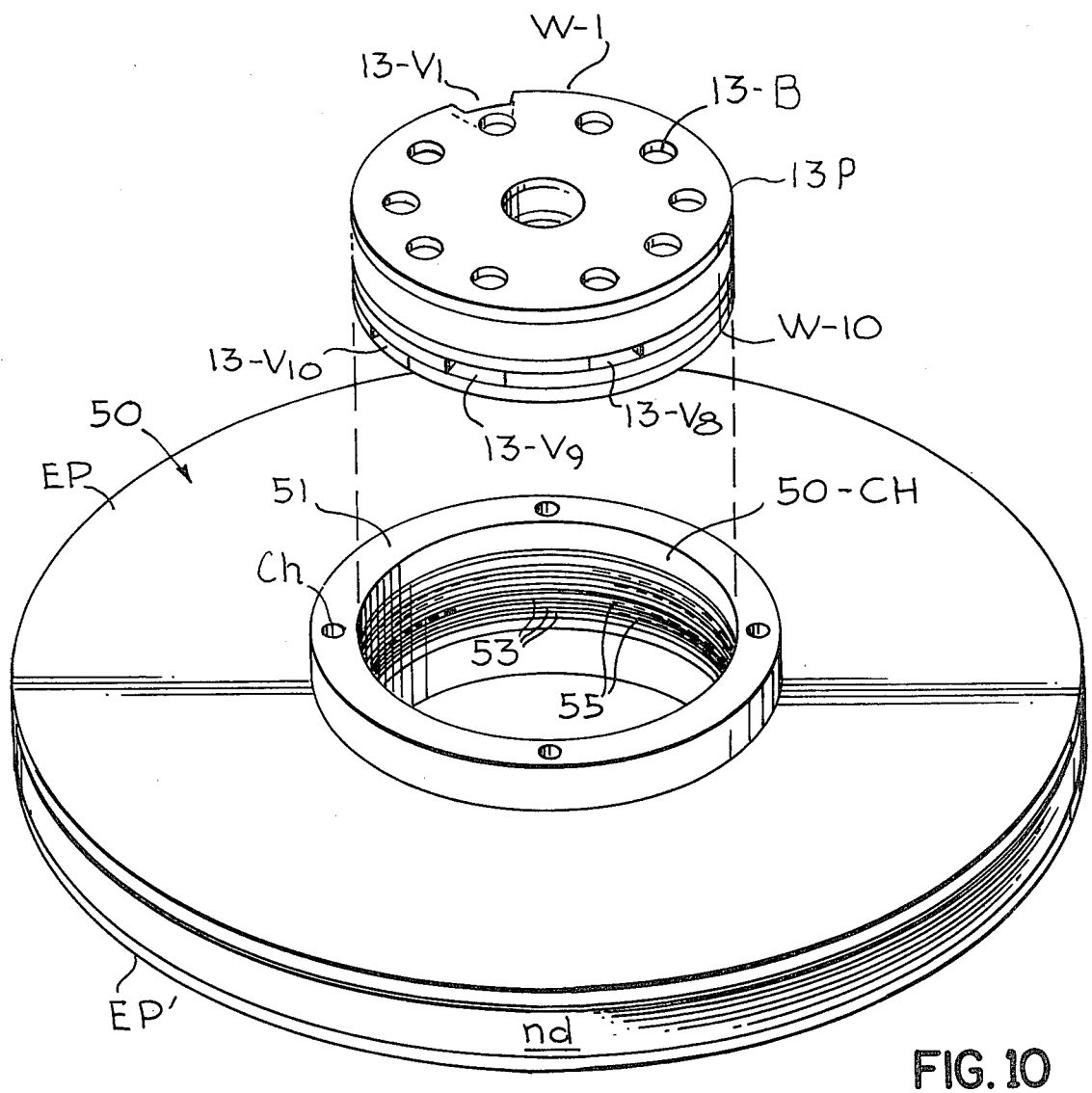
FIG. 10 is a schematic perspective of a pack modified from that shown in FIG. 1 and with a different, non-preferred, arrangement for supplying gap-air to the records thereof.

"Non-Rimmed" versions; FIGS. 10, 11 and 12

FIGS. 10 through 12 illustrate "non-rimmed" versions of means for conducting partition air—here presented only to offer a contrast with the "rimmed" versions of this invention. FIG. 10 shows one that involves a "hub-distributor" 13-P for partition air; something that leaves the disks and intervening spacers unmarked by partition holes, but made-up of plates W-1 through W-10 which include the ring of partition holes, (like holes h above), with one hole on each plate "cut-out" radially to divert separation air to its gap. More details on FIGS. 10-12 may be seen in companion commonly assigned U.S. Ser. No. 092,728 entitled "Spacers for End-Wise Pneumatic Partitioned Disk Pack" by inventors Herbert U. Ragle and Dean DeMoss filed on Nov. 9, 1979, now abandoned in favor of Ser. No. 292,072, filed Aug. 12, 1981 for "Spacer For End-Wise Pneumatic Partitioned Disk Pack" and incorporated herewith by this reference.

FIG. 11 illustrates inter-disk spacers which are "radially cut-out", rather than "rimmed". Here, it will be assumed that eleven (11) spacer disks are provided (only 3 shown) for a 10-disk pack Pk. All ten partition apertures H-1 through H-10 are provided in the bottommost spacer SD-1, while each successive spacer thereabove eliminates one more such aperture. Thus, as FIG. 11 suggests, spacer SD-2 eliminates aperature H-1; SD-3 eliminates H-1 plus H-2 . . . , SD-8 eliminates H-1 through H-9. Uppermost spacer SD-11 (not shown) has no apertures H at all.

An extra hole (sight-hole $h_o$) is preferably supplied in all the spacers SD to assure pack registration.

Thus, this pack contemplates a blank spacer SD-11 plus ten (10) apertured "inter-disk" spacers, SD-1 through SD-10—each latter having a different respective radial communication ("cut-out" or slotting SL) to communicate with the corresponding inter-disk gap— e.g., slotting SL-1 communicates with the gap $g_{1-2}$ between disks FD-1 and FD-2, pneumatically coupling $g_{1-2}$ to the bore formed by apertures H-1.

Of course, alternatively, each spacer SD may be supplemented by a second inter-disk spacer—being fully-apertured as in prior art embodiments.

FIG. 12 illustrates a modified spacer 11-S, generally like spacers SD in FIG. 11, except that involves a "single-stamping" or common spacer pattern to be used throughout the disk pack. That is, each floppy disk in the pack will be understood as identical, being formed with 20 apertures, each to be registered with one of the spacer-apertures 11-A and having one of the identical spacers 11-S on each side thereof. Each of the identical spacers 11-S also has a set of clamp-post holes 11-h (four shown), each of these being adapted to receive a clamping post for retaining the pack together. Each spacer 11-S also has a pair of radial vents, or cut-outs, (see 11-ct at apertures #1 and #11 in FIG. 11). The spacers are differentially stacked so that cut-outs 11-ct fall at different successive aperture site pairs up disk stack (e.g., with 20 identically numbered holes hh in the stacked disks, registering with apertures #1 through #20, one might position the "first" spacer 11-S$_1$ in the "first" inter-disk gap so that cut-outs 11-ct register with the disks' partition holes #1 and #11; then position the "second" spacer 11-S$_2$ to be "rotated-by-one" so that its cut-outs register with disk holes #2 and #12, and so on, rotating each spacer "by-one" as one proceeds up the disk stack).

In this fashion, spacers 11-S will be stacked between respective disks so that their cut-outs service (direct air to) a different respective inter-disk gap.

Partition Plug; FIG. 10:

FIG. 10 indicates a "radially vented" plug for distributing separation air. Here, plates W are assembled into a prescribed cylindrical partition plug 13-P as part of a "partitioning piston" array (not shown) adapted to selectively partition a floppy pack 50 of relatively known conventional construction.

FIG. 10 indicates a flexible disk pack 50 in exploded relation with the associated partitioning piston or plug 13-P. Pack 50 is comprised of a coaxial stack of identical, commonly-supported, flexible disk records 55, understood as mounted and retained, along with intermediate conventional spacers 53, between a pair of opposed flexible end-plates, EP, EP'. Disks 55 are spaced-apart a prescribed uniform distance by identical conventional annular separator rings 53 which are radially-vented, or made radially "air permeable". The array of disks and inter-disk spacers is clamped firmly between the end-plates by a pair of opposed collars 51, 51' using means known in the art (e.g., with bolts or rivets threaded through holes ch in collars 51, disks 55 and spacers 53; or by like fastener means understood by workers in the art).

The inner circumferences of disks 55, of spacers 53 and of collars 51, as so stacked and clamped together, as to be relatively congruent and define the sides of a cylindrical center-hole 50-CH so that its ten respective plates W lie with their radial-vented holes 13-v aligned to communicate with associated inter-disk gaps (e.g., hole 13-v$_1$ with the uppermost gap g$_1$, 13-v$_{10}$ with the lowermost gap g$_{10}$, etc.). Workers will recognize that special pains must be taken to assure this alignment—something very difficult for a removable pack.

Flexible disks 55 and spacers 53 are of a type known in the art and, as workers will appreciate, may assume various dimensions and compatible constructions.

More particularly, vented ring spacers 53 help to maintain recording disks 55 normally separated and lubricated by a thin film of air, as well as serving, during special partition times, to pass partitioning air jets. Workers will recognize that such pneumatic separation depends upon the clearance dimension CL between the outer side walls of plug 13-P and the inner walls of pack center-hole 50-CH. If this clearance is not above a certain minimum, a vacuum will result between disks 55, pulling them together; while if it is too large, excessive air-flow between disks may agitate them.

Workers in the art will recognize that flexible disk packs like pack 50 are apt for use with such "interior pneumatic partitioning" means, like partitioning plug 13-P.

Partitioning cylinder 13-P is adapted to direct a "disk-parting" air jet radially-outward through a disk pack like that described (including vented spacers) and will be understood as comprising a stack of plates W, each identically apertured (see ten holes 13-B in each) with (one or more of) these holes having a radial vent 13-v (e.g., in the manner of spacers 11-S of FIG. 12). Here, one of the ten partition holes 13-B is radially cut-out (e.g., at $13-v_1$ on top plate W-1; at $13-v_{10}$ on bottom plate W-10, etc.)—these cut-outs being deployed at different successive sectorial positions about plug 13-P as shown.

Thus, when plug 13-P is properly positioned in center-hole 50-CH of pack 40, and with the pack and plug properly spun-up in synchronism, partition air will be drawn up a selected bore through plug 13-P and will issue radially out through the associated vent 13-v, and projected into the associated inter-disk gap g, traversing the associated intermediate vented spacer 53.

The foregoing description of the "non-rimmed" partition in FIGS. 10 through 12 will be understood as indicating techniques and structures serving to highlight the differences and advantages of the preferred "rimmed" embodiments described herein.

Conclusion

It will be appreciated that novel flexible disk pack partition arrangements and techniques as here described may be used, with the indicated and with other related recording systems and be advantageously employed in various ways. Such arrangements will be seen as especially advantageous in conjunction with disk packs like those described. It will also be understood that the preferred embodiments described herein are only exemplary and that they are susceptible of many modifications and variations in construction, arrangement and use, without departing from the spirit of the invention. For example, it should not be assumed that the pneumatic partitioning means must necessarily be, alone, capable of (or necessary for) partitioning the pack all by itself—while this is advantageous, and facilitates quick partitioning and simple transducer entry, other related supplemental partitioning means may be employed in certain appropriate instances, (e.g., to complete partitioning, once the pneumatic means have initiated the partition opening).

Further modifications of the invention are also possible. For example, the means and methods disclosed herein are also applicable with different pneumatic partition supply means and associated distributor means. Also the present invention is applicable for use with various other means for actuating and/or positioning the transducer means. Further, various non-illustrated variants will be contemplated within the scope hereof. For instance, the enlargements (cut-outs) may, in certain cases also be provided in adjacent disks (next to the gap and spacer-orifice, or disk-orifice where no spacer is used. Also, in certain cases, two or more such entry holes on each spacer (and/or disk) will be so enlarged; e.g., to increase flow into a gap. Flow may also be increased by other similar means; e.g., by forming a plurality of hole-rings, as in FIG. 14, and using one (or more) hole in two (or more) rings as an entry-hole (e.g., also tying all common entry holes, leading to a given gap, to the same air-flow supply circuit for convenience). For instance, where three such hole-rings is available, one might select one hole from each as the orifice to a given gap, staggering these entry-holes rotationally (e.g., about 120° apart).

The above examples of possible variations of the present invention are merely illustrative. Accordingly the present invention is to be considered as including all possible modifications and variations coming within the scope of the invention as defined by the appended claims.

What is claimed is:

1. In an improved pack of flexible disks adapted to be pneumatically partitioned axially and wherein the disks are formed with gas-conducting apertures therethrough, the improvement therewith of rim means disposed in each gap defined between adjacent disks, and about adjacent apertures between respective disks, the rim means comprising "full-rim" annuli about certain apertures, being adapted to isolate the gap from the gas stream passing axially-up through certain "isolated" ones of said apertures, and certain other diverting "partial-rim" annuli only partly encircling other "entry" ones of said apertures communicating penumatically with the subject gap to divert gas into the respective inter-disk gap rather than across this gap; these annuli also providing a reference platform against which the disks may be pressed; and wherein enlargement means characterize at least some of said "entry" apertures, so as to facilitate increased gas flow therethrough.

2. The combination as recited in claim 1 wherein the annuli are attached on a respective disk.

3. The combination as recited in claim 1 wherein "partial rim means" are provided about said "entry" apertures, being built-up opposite said enlargement means to divert the associated gas-stream into the associated gap.

4. The combination as recited in claims 1 or 3 wherein at least some of the rim means comprise like, flat-faced annular rings, or "annulets", of identical height surrounding a respective one of said apertures.

5. The combination as recited in claim 4, wherein the rim means also include one or more "semi-annulets", identical to the said annulets except that part of the ring configuration is broken-away so as to so divert the gas stream; and wherein said enlargement means comprises a crescentic cut-out enlarging an "otherwise circular" hole to present about twice the orifice size or more.

6. The combination as recited in claim 5, wherein said rim means is disposed directly on each flexible disk.

7. The combination as recited in claim 5, wherein said pack includes like spacer means between said disks, wherein said rim means and said enlargement means are formed on, and in, each said spacer means, wherein said pack is removable, including a central hub-opening being fastened between upper and lower collar means; and wherein said rim means also includes a "hub-rim" of the same height as the annulets and surrounding said hub-opening; and wherein said "semi-annulets" and opposing crescentic enlargements cooperate to divert their gas-stream inwardly toward the disk center to impact said hub-rim and be diffused-out and centrifugally spun-off therefrom.

8. The combination as recited in claim 7, wherein the pack includes fastener means connecting said collars so as to press the disks and spacer means together, each disk also includes an array of fastener-holes adapted to pass said fastener means; and wherein the rim means further includes "fasten-annulets", each surrounding a fastener-hole, being otherwise identical to said "annulets".

9. The combination as recited in claim 8, wherein said spacer means comprises one or more metal plates etched to present the recited rim means configuration on one or both sides.

10. The combination as recited in claim 5, wherein the pack is "fixed" and not removable.

11. The combination as recited in claim 1, wherein said "entry" apertures are partially surrounded by "diversion means" disposed opposite the "enlargement means" of each entry aperture, these being adapted to redirect a passing stream of separation gas along certain sectors of the subject gap.

12. A pack of flexible disks characterized by thru-holes in the disks adapted to pass separation air streams axially of the pack, with some "conducting" ones of said holes adapted to pass said streams and other "inlet" ones of said holes adapted to admit their streams into pneumatic communication with the adjacent inter-disk gap, the improvement therein comprising:

an enlargement cut-out provided in each said "inlet-hole" so as to enhance stream thru-put, and with said "conducting holes" "fully-rimmed" and said inlet holes "semi-rimmed" about a prescribed sector, opposite the cut-out to divert air between disks rather than through the gap therebetween said cut-out portion thereof thus being disposed along a non-rimmed sector of its hole.

13. An improved flexible record disk adapted to be incorporated into a rotatable pack and pneumatically partitioned axially, the disk being formed with gas-conducting holes therethrough and with rim means disposed about theses holes; certain conductor ones of these rim means being adapted to isolate the inter-disk gap from the gas stream passing axially-upward through certain like "isolated conductor" ones of said holes, with certain other entry ones of the rim means comprising partly-encircling, air-diverting means about certain like "entry ones" of these holes, these diverting entry rim means being adapted to divert air into, rather than across, the respective inter-disk gap, all rim means also providing a like reference platform against which the stacked disks may be pressed; said "entry holes" being somewhat larger than said "conductor holes", and with "partial rim means" provided about said "entry-holes", and being built-up opposite a certain enlargement sector of the "entry-holes" to divert the passing gas-stream into the associated gap;

wherein at least some of the rim means comprise like, flat-faced annular rings, or "annulets", of identical height surrounding a respective one of said holes;

wherein the "partial rim means" comprises a "semi-annulet" identical to the said "annulets" except that part of their ring configuration is broken-away so as to so divert the gas stream; and wherein the "enlargement means" characterizes at least some of said "entry-holes", being adapted to facilitate greater gas thru-put therethrough, this enlargement means comprising a crescentic cut-out enlarging an "otherwise circular" hole to make the orifice at least twice the size of the "conductor holes".

14. A method for forming a pack of flexible disks adapted to be pneumatically partitioned axially comprising:

forming disks to include gas-conducting apertures therethrough; stacking the disks to form a pack while providing rim means disposed in each gap formed between respective adjacent disks, the rim means comprising "full-rim annuli" completely encircling certain apertures and adapted to isolate the associated gap from the gas stream passing axially-up through "isolated" ones of said apertures and further comprising "partial-rim annuli" only partly encircling other respective "entry apertures" to divert gas into the respective inter-disk gap rather than direct it through the gap, all said annuli also providing a reference platform when said disks are in abutting contact; the entry apertures being enlarged to facilitate increased through-flow.

15. The method as recited in claim 14, wherein "partial rim means" are provided about said "entry" apertures, being built-up opposite said enlarged entry apertures these being provided to divert the associated gas-stream into the associated gap;

wherein at least some of the rim means are made to comprise like, flat-faced annular rings or "annulets" of identical height surrounding a respective one of said apertures;

wherein the rim means are also formed to include one or more "semi-annulets", these being made identical to the said annulets except that part of the ring configuration is broken-away so as to so divert the gas stream; and wherein the enlargement means is formed to comprise a crescentic cut-out enlarging an "otherwise circular" hole to present about twice the orifice size or more.

* * * * *